United States Patent
Nielsen et al.

(10) Patent No.: US 9,570,916 B2
(45) Date of Patent: Feb. 14, 2017

(54) INERTIAL RESPONSE FUNCTION FOR GRIDS WITH HIGH TURBINE PENETRATION

(71) Applicants: Kaj Skov Nielsen, Issaquah, WA (US); Robert J. Nelson, Orlando, FL (US)

(72) Inventors: Kaj Skov Nielsen, Issaquah, WA (US); Robert J. Nelson, Orlando, FL (US)

(73) Assignee: Siemens Aktiengesellschaft, Munich (DE)

(*) Notice: Subject to any disclaimer, the term of this patent is extended or adjusted under 35 U.S.C. 154(b) by 579 days.

(21) Appl. No.: 14/054,368

(22) Filed: Oct. 15, 2013

(65) Prior Publication Data

US 2015/0102679 A1   Apr. 16, 2015

(51) Int. Cl.
| H02J 3/38 | (2006.01) |
| H02J 3/24 | (2006.01) |
| F03D 9/00 | (2016.01) |
| H02J 3/00 | (2006.01) |

(52) U.S. Cl.
CPC .............. *H02J 3/386* (2013.01); *F03D 9/005* (2013.01); *H02J 3/24* (2013.01); *F05B 2270/337* (2013.01); *H02J 2003/001* (2013.01); *Y02B 10/30* (2013.01); *Y02E 10/72* (2013.01); *Y02E 10/763* (2013.01); *Y10T 307/718* (2015.04)

(58) Field of Classification Search
CPC .............. F03D 9/005; H02J 3/24; H02J 3/386; H02J 2003/001; F05B 2270/337; Y02B 10/30; Y02E 10/72; Y02E 10/763; Y10T 307/718

USPC ........................................................... 307/84
See application file for complete search history.

(56) References Cited

U.S. PATENT DOCUMENTS

| 2007/0047163 A1* | 3/2007 | Lutze .................... F03D 7/0284 361/78 |
| 2009/0160187 A1* | 6/2009 | Scholte-Wassink .. F03D 7/0284 290/44 |
| 2009/0234510 A1* | 9/2009 | Helle .................... F03D 7/0284 700/287 |
| 2011/0153099 A1* | 6/2011 | Garcia .................... H02J 3/386 700/287 |
| 2012/0104756 A1* | 5/2012 | Beekmann ............ F03D 7/0224 290/44 |
| 2012/0139241 A1 | 6/2012 | Haj-Maharsi et al. |
| 2012/0203384 A1* | 8/2012 | Arlaban Gabeiras ..... H02J 3/06 700/286 |
| 2015/0021912 A1* | 1/2015 | Bech .................... F03D 7/0276 290/44 |

* cited by examiner

*Primary Examiner* — Rexford Barnie
*Assistant Examiner* — Toan Vu
(74) *Attorney, Agent, or Firm* — Beusse Wolter Sanks & Maire

(57) ABSTRACT

A method for compensating at least partially a frequency deviation in a grid is provided in which a grid frequency is determined and the grid frequency is applied to a grid frequency criterion. If the grid frequency meets the grid frequency criterion, a determination is made as to a set of wind turbines from a wind turbine power plant fleet based on the grid frequency criterion, and a command for a transient frequency response is transmitted to the set of wind turbines.

17 Claims, 2 Drawing Sheets

INERTIAL RESPONSE FUNCTION FOR GRIDS WITH HIGH TURBINE PENETRATION

FIELD OF INVENTION

The present invention relates to the field of power plants and power system operation.

BACKGROUND

In case of a frequency deviation in a grid, most electrical generators comprised of electrical machines directly connected to the grid provide a natural inertial response compensating for the occurring frequency deviation. For example, when the frequency declines, the generator shaft slows, releasing kinetic energy that is converted to electric power, which partially compensates for the lack of energy that causes the frequency decline. When the frequency increases, the generator shaft speed increases, causing the generator to absorb energy from the power system, thereby partly compensating for the surplus of energy that caused the frequency increase. Conventional electrical energy generators, like a coal plant or a nuclear plant, provide inertial response according to the inherent characteristics of the turbine and generator used for the power generation.

Converter-controlled equipment, like wind turbine and solar PV, do not provide any response to abnormal frequency unless this capability is programmed into the controls. A requirement to provide this capability is often stipulated by grid operators. As more and more renewable energy power plants like wind turbines using full inverters are providing this ancillary service as transient frequency response to the grid, the grid operators may need more flexibility in selecting the magnitude of the response to such frequency drops. At this time, in case of a frequency drop in a grid, a renewable energy power plant like a wind turbine may be constrained to provide the maximum transient frequency response it is able to deliver to the grid at the threshold frequency. With the increasing number of wind turbines as renewable energy power plants, this may lead to an overcompensation of the frequency deviations in a grid, which may lead to further de-stabilizing the grid frequency Therefore, there may be a need for an improved reaction possibility for a wind turbine as well as for an entire wind turbine power plant fleet, in case of a detected frequency deviation in a grid, in order to provide an appropriate assistance for a stabilization of the grid frequency.

SUMMARY OF THE INVENTION

This need may be met by the subject matter according to the independent claims. Advantageous embodiments of the present invention are described by the dependent claims.

According to a first aspect of the invention there is provided a method for compensating at least partially a frequency deviation in a grid, the method comprising: Determining a grid frequency and applying the grid frequency to a grid frequency criterion. In case the grid frequency meets the grid frequency criterion, the method moreover comprises determining a set of wind turbines from a wind turbine power plant fleet based on the grid frequency criterion, and transmitting a command for a transient frequency response to the set of wind turbines.

A grid according to the invention may be any electric supply network or electricity network. In particular, a grid may be an electric supply network used for transportation of electrical energy from an electric energy generator, such as a power plant to an electrical consumer such as an industry, a city, a domestic home, a commercial building, a hospital and the like.

A frequency deviation according to the invention may be any deviation of a grid frequency from the standard grid frequency. In general, standard grid frequencies are 50 Hz or 60 Hz at different voltage levels.

A grid frequency criterion according to the invention may be any criterion usable for determining a set point/actual-value comparison.

A set of wind turbines according to the invention may be any desired quantity of wind turbines located within a wind turbine power plant fleet.

A transient frequency response according to the invention may be any reaction of a wind turbine, suitable for providing at least a part of a stabilization of the grid frequency at the standard grid frequency level. More particular, a transient frequency response may provide a response level and a response duration.

This aspect of the invention is based on the idea that by providing a method for transmitting a command for a transient frequency response to only a set of wind turbines within a wind turbine power plant fleet, a more suitable response may be provided to the grid, in order to stabilize the grid frequency quickly.

According to a further embodiment of the invention the method further comprises: In case the grid frequency meets the grid frequency criterion, determining a magnitude of the transient frequency response for the set of wind turbines based on the grid frequency criterion, and transmitting the command for the transient frequency response to the set of wind turbines, including the magnitude of the transient frequency response.

A magnitude of the transient frequency response according to the invention may be a level of reaction of a wind turbine. In particular, the magnitude of the transient frequency response may require the extraction of kinetic energy from the rotor and delivering it to the grid as a transient power increase or a reduction in power generation and delivering it to the system as a transient power decrease.

This embodiment of the invention is based on the idea that by providing a method for transmitting a command for the magnitude of a transient frequency response to the chosen set of wind turbines within a wind turbine power plant fleet, a suitable and flexible aggregate response may be provided to the grid at the point of interconnection, in order to stabilize the grid frequency quickly.

According to a further embodiment of the invention the method further comprises: In case the grid frequency meets the grid frequency criterion, determining the magnitude of the transient frequency response individually for each wind turbine from the set of wind turbines, and transmitting the command for the transient frequency response individually to each wind turbine from to the set of wind turbines, including the respective magnitude of the transient frequency response.

This embodiment of the invention is based on the idea that by providing a method for transmitting an individual command for the magnitude of a transient frequency response to each wind turbine from the chosen set of wind turbines within a wind turbine power plant fleet, an even more suitable and flexible response may be provided to the grid, in order to stabilize the grid frequency quickly.

According to a further embodiment of the invention the method comprises: In case the grid frequency meets the grid frequency criterion, determining an amount of additional power needed from the wind turbine power plant fleet based on the grid frequency criterion, and determining the set of wind turbines from the wind turbine power plant fleet based on the amount of additional power needed.

Power according to the invention may in particular be power in form of electrical energy.

This embodiment of the invention is based on the idea that by determining the amount of additional power needed from the wind turbine power plant fleet, the set of wind turbines needed for the response may be estimated more precisely and thus a suitable and flexible response may be provided to the grid, in order to stabilize the grid frequency quickly.

According to a further embodiment of the invention the method comprises: Determining the magnitude of the transient frequency response for the set of wind turbines is further based on an amount of additional power needed.

This embodiment of the invention is based on the idea that by providing a method for determining the magnitude of a transient frequency response based on an amount of additional power needed, this magnitude may be estimated more precisely, and thus, an even more suitable response may be provided to the grid, in order to stabilize the grid frequency quickly.

According to a further embodiment of the invention the method comprises: Determining the magnitude of the transient frequency response individually for each wind turbine from the set of wind turbines is further based on an amount of additional power needed.

This embodiment of the invention is based on the idea that by providing a method for determining the magnitude of a transient frequency response individually for each wind turbine from the set of wind turbines based on an amount of additional power needed, the respective magnitude may be estimated more precisely, and thus, an even more suitable response may be provided to the grid, in order to stabilize the grid frequency quickly.

According to a further embodiment of the invention the method comprises: Determining the set of wind turbines from the wind turbine power plant fleet is further based on the number of wind turbines being online in the wind turbine power plant fleet.

An online wind turbine according to the invention may be a wind turbine power plant from the wind turbine power plant fleet that is generating electrical energy. In particular it may be a wind turbine power plant that is connected to the grid, thus being able to feed in generated electrical energy to the grid.

This embodiment of the invention is based on the idea that by determining the set of wind turbines only from the online wind turbines in the wind turbine power plant fleet, only wind turbine power plants are chosen for providing the response, which are able to provide their response within a short time. Thus, an even more suitable response may be provided to the grid, in order to stabilize the grid frequency quickly.

According to a further embodiment of the invention the method comprises: Determining the magnitude of the transient frequency response for the set of wind turbines is further based on the number of wind turbines being online in the wind turbine power plant fleet.

This embodiment of the invention is based on the idea that by determining the magnitude of the transient response for the set of wind turbines based only on the online wind turbines in the wind turbine power plant fleet, only wind turbine power plants are taken into account that are able to provide their response within a short time. Thereby, the response magnitude for the set of wind turbines may be estimated more precisely. Thus, an even more suitable response may be provided to the grid, in order to stabilize the grid frequency quickly.

According to a further embodiment of the invention the method comprises: Determining the magnitude of the transient frequency response individually for each wind turbine from the set of wind turbines is further based on the number of wind turbines being online in the wind turbine power plant fleet.

This embodiment of the invention is based on the idea that by determining the magnitude of the transient response individually for each wind turbine from the set of wind turbines based only on the online wind turbines in the wind turbine power plant fleet, only wind turbine power plants are taken into account that are able to provide their response within a short time. Thereby, the individual response magnitude of a wind turbine may be estimated more precisely. Thus, an even more suitable response may be provided to the grid, in order to stabilize the grid frequency quickly.

According to a further embodiment of the invention the method comprises: Determining the magnitude of the transient frequency response for the set of wind turbines is further based on an average energy production level of the wind turbines in the wind turbine power plant fleet.

This embodiment of the invention is based on the idea that by determining the magnitude of the transient response for the set of wind turbines based on an average production level of the wind turbines in the wind turbine power plant fleet, the response may be estimated even more precisely. Thereby, the response magnitude for the set of wind turbines may be estimated more precisely. Thus, an even more suitable response may be provided to the grid, in order to stabilize the grid frequency quickly.

According to a further embodiment of the invention the method comprises: Determining the magnitude of the transient frequency response individually for each wind turbine from the set of wind turbines is further based on an individual energy production level of the respective wind turbine.

The decision of how to determine the transient frequency response command from the set of wind turbines may be, for example, based on an evaluation of the available transient frequency response from each turbine or set of turbines.

This embodiment of the invention is based on the idea that by determining the magnitude of the transient response individually for each wind turbine from the set of wind turbines based on an individual energy production level of the respective wind turbine, the individual response from each wind turbine from the set of wind turbines may be estimated even more precisely. Thereby, the response magnitude for the set of wind turbines may be estimated more precisely. Thus, an even more suitable response may be provided to the grid, in order to stabilize the grid frequency quickly.

According to a further embodiment of the invention the method comprises: In case the grid frequency meets the grid frequency criterion, determining a time period for the transient frequency response for the set of wind turbines based on the grid frequency criterion, and transmitting the command for the transient frequency response to the set of wind turbines, including the time period of the transient frequency response.

A time period of the transient frequency response according to the invention may in particular be the duration of the transient frequency response from a respective wind turbine.

This embodiment of the invention is based on the idea that the amount of the transient frequency response may be identified not only by the level or magnitude of the transient frequency response, but also by the duration of such a level or strength. Thus, an even more suitable response may be provided to the grid, in order to stabilize the grid frequency quickly.

According to a further embodiment of the invention the method comprises: Providing at least two grid frequency sub-criteria, and in case the grid frequency meets one of the at least two grid frequency sub-criteria, setting this grid frequency sub-criterion as the grid frequency criterion.

In particular, there may be one or more threshold frequencies where some degree of frequency response may be required. By setting a sub-criterion out of several sub-criteria as the grid frequency criterion this requirement may be fulfilled.

This embodiment of the invention is based on the idea that by providing more than on grid frequency criterion, different response strategies may be applied to the wind turbine power plant fleet, depending on the nature of the deviation of the grid frequency. Thus, an even more suitable response may be provided to the grid, in order to stabilize the grid frequency properly and quickly, with minimal oscillatory behavior.

According to a further embodiment of the invention the method comprises: Performing a stepped transient frequency response, by using at least two of the grid frequency sub-criteria.

With this, there may be provided different set point frequencies to a wind turbine or a set of wind turbines. To explain this in more detail the following example may be useful, but shall not limit the invention to this example. Other percentages as well as other frequencies and combinations thereof may also be useful and may even provide more optimized responses. For example, if a frequency drop in a 60 Hz grid may occur, this may lead to a frequency drop from 60 Hz to below 59.6 Hz. With the method described in this embodiment, 10% of the wind turbines from the wind turbine power plant fleet may provide a first stepped response at 59.75 Hz, another 20% of the wind turbines from the wind turbine power plant fleet may provide a second stepped response at 59.7 Hz, and another 20% of the wind turbines from the wind turbine power plant fleet may provide a third stepped response at 59.65 Hz. Finally, if this still may not stabilize the grid, 100% of the wind turbines of the wind turbine power plant fleet may provide a final stepped response at 59.6 Hz. With this, all of the wind turbines do not increase their power output and come down simultaneously, thus providing a staggered output, rather than a single large step, which, at high wind penetration levels, may exacerbate frequency deviations. This may be, for example, done either by sending commands from a central controller or by individual turbine controls.

This embodiment of the invention is based on the idea that by performing a stepped transient frequency response, by using at least two of the grid frequency sub-criteria, different response strategies may be applied cascaded to the wind turbine power plant fleet, depending on the amount of deviation of the grid frequency. Thus, an even more suitable response may be provided to the grid, in order to stabilize the grid frequency properly and quickly.

According to a further aspect of the invention there is provided a grid operating device for compensating a frequency deviation in a grid, the grid operating device comprising: A grid frequency determination unit for determining a grid frequency, a grid frequency comparison unit for comparing, if the grid frequency meets a grid frequency criterion, a wind turbines determination unit for determining a set of wind turbines from a wind turbine power plant fleet based on the met grid frequency criterion, and an transient frequency response command transmission unit for transmitting a command for an transient frequency response to the set of wind turbines.

This aspect of the invention is based on the idea that for estimating an appropriate transient frequency response to the grid a grid operating device may be useful for providing and controlling the herein before mentioned method to a wind turbine power plant fleet.

A transient frequency response may be triggered by distributing a state command activating a preprogrammed response profile, and/or it may be triggered by an on line distribution of a set profile. Moreover, it may also be triggered by a combination of a local and a central controller. The trigger function for the activation may be located centrally and/or it may be located at the unit level or any combination thereof.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
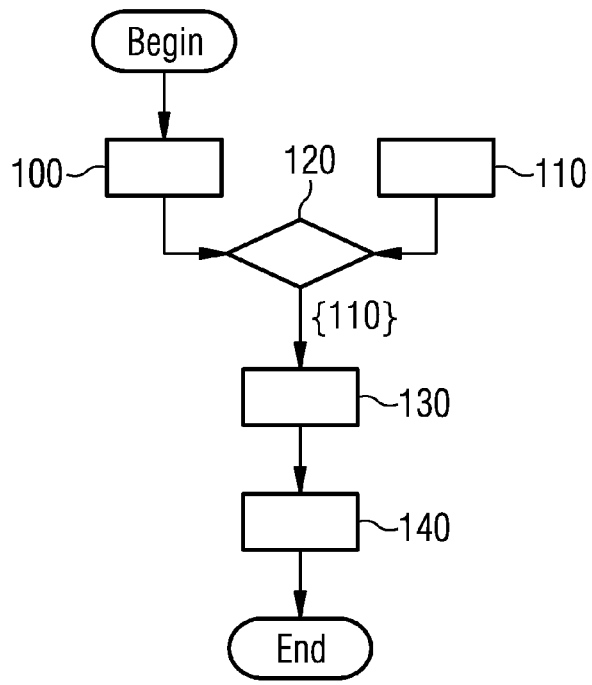
FIG. 1 shows a schematic drawing of a proposed method according to an exemplary embodiment of the invention.

The illustration in the drawing is schematically. It is noted that in different figures, similar or identical elements or features are provided with the same reference signs or with reference signs, which are different from the corresponding reference signs only within the first digit. In order to avoid unnecessary repetitions elements or features which have already been elucidated with respect to a previously described embodiment are not elucidated again at a later position of the description.

FIG. 1 shows a schematic drawing of a proposed method according to an exemplary embodiment of the invention. FIG. 1 shows a method for compensating at least partially a frequency deviation in a grid, the method comprising: Determining 100 a grid frequency and applying 120 the grid frequency to a grid frequency criterion 110. In case 120 the grid frequency meets the grid frequency criterion 110, determining 130 a set of wind turbines 320 from a wind turbine power plant fleet 300 based on the grid frequency criterion 110, and transmitting 140 a command for a transient frequency response to the set of wind turbines 320.

Figure 2:
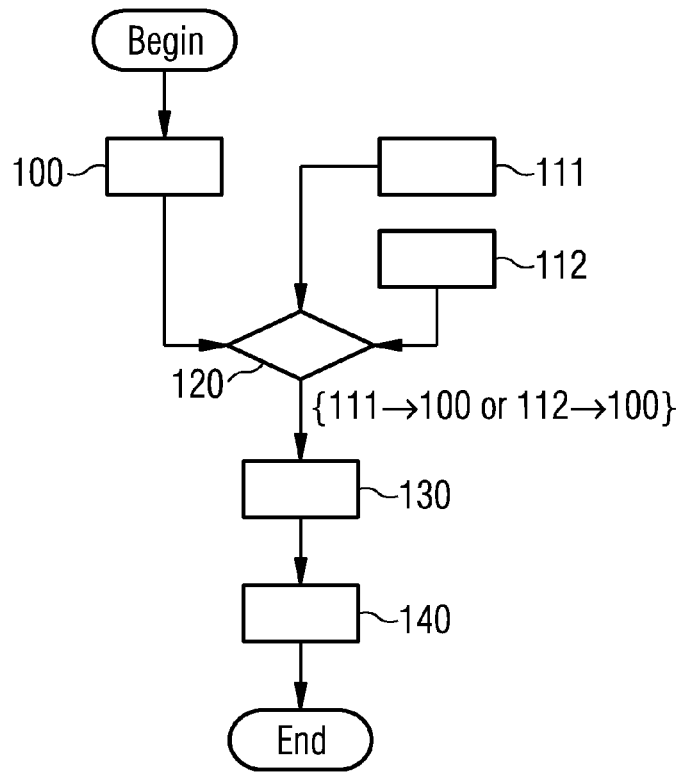
FIG. 2 shows a schematic drawing of a proposed method according to another exemplary embodiment of the invention.

FIG. 2 shows a schematic drawing of a proposed method according to another exemplary embodiment of the invention. The method shown in FIG. 2 is similar to the one illustrated in FIG. 1. The method in FIG. 2 moreover comprises: Providing at least two grid frequency sub-criteria 111, 112, and in case 120 the grid frequency meets one of the at least two grid frequency sub-criteria 111, 112, setting this grid frequency sub-criterion 111, 112 as the grid frequency criterion 110. This is illustrated by "{111->100 or 112->100}".

For power plants where the transient frequency response is placed at the turbine level and executes as a pure step response in response to a trigger command from a central controller or in response to a local frequency measurement, the aggregate response from an entire power plant fleet 300 may be modulated by differentiating the trigger point either by setting differentiated trigger values at the wind turbine 310 levels, but more accurate control may be possible by designing a differentiated trigger function at a central power plant controller 220 (shown in FIG. 3), distributing commands for a transient frequency response from an individual wind turbine 310 or from sets of wind turbines 320.

A central function or method, as described herein, may dynamically assign wind turbines 310 a trigger point based on the number of wind turbines 310 on line in the wind turbine power plant fleet 300 in order to ensure a desired aggregate response.

A central function or method, as described herein, may pre distribute the trigger points or may distribute a trigger signal at the time of desired activation.

The distribution may take the available transient frequency response of the individual wind turbines 310 into account, such that the expected aggregate transient frequency response may be equal for each set of wind turbines 320, or may be equal for each unique trigger point or such that the aggregate transient frequency response may be grouped and simulate a proportionality to the magnitude of the frequency error or some other mathematical transfer function between the frequency error and the magnitude and/or timing of the aggregate transient frequency response.

Figure 3:
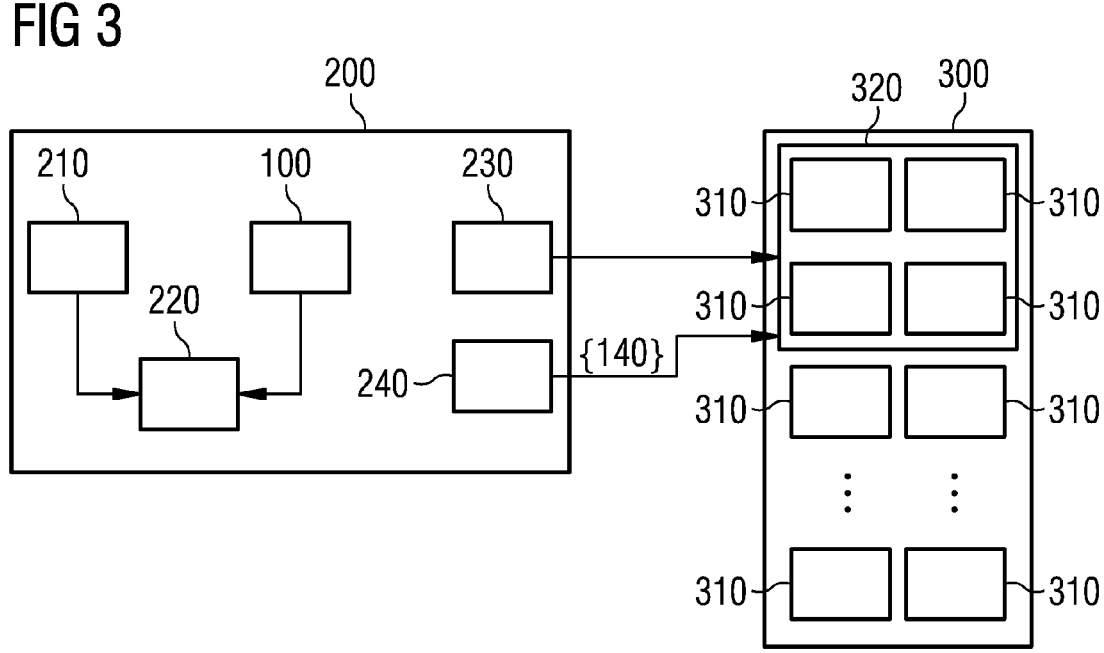
FIG. 3 shows a schematic drawing of a proposed grid operating device interacting with a wind turbine power plant fleet according to an exemplary embodiment of the invention.

FIG. 3 shows a schematic drawing of a proposed grid operating device interacting with a wind turbine power plant fleet according to an exemplary embodiment of the invention. FIG. 3 illustrates a grid operating device 200 for compensating a frequency deviation in a grid, the grid operating device 200 comprising: A grid frequency determination unit 210 for determining a grid frequency, a grid frequency comparison unit 220 for comparing, if the grid frequency meets a grid frequency criterion 110, a wind turbines determination unit 230 for determining a set of wind turbines 320 from a wind turbine power plant fleet 300 based on the met grid frequency criterion 110, and a transient frequency response command transmission unit 240 for transmitting 140 a command for a transient frequency response to the set of wind turbines 310.

Such a grid operating device 200 may be also known as a central function control device. It could command 140 responses from individual wind turbines 310 or a set or sets of turbines 320 based on designated frequency trigger points for each wind turbine 310 or set of wind turbines 320. For example, one set of turbines 320 may provide a response if the frequency drops to 99% of nominal, while another set of wind turbines 320 may provide a response if the frequency subsequently drops to 98.5%, etc. Or for example, different time delays after onset of a frequency incident may be incorporated into the control method.

Such a grid operating device 200 may be for example implemented into a centralized park controller on either the high voltage or the medium voltage side of the main transformer, depending on how the software code may be developed for executing the method described in this invention. In addition, for controlling the voltage (reactive power/power factor) at the wind turbine 310 level the central park controller may be able to control the transient frequency response of the wind turbines 310 individually, in order to modulate the aggregate transient frequency response at the point of measurement of the grid frequency.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

It is noted that it may also be possible in further refinements of the invention to combine features from different illustrative embodiments described herein. It should also be noted that reference signs in the claims should not be construed as limiting the scope of the claims.

In order to recapitulate the above described embodiments of the present invention one can state:

As more and more renewable energy power plants like wind turbines using full inverters are providing this ancillary service as transient frequency response to the grid, the grid operators may need more flexibility in selecting the magnitude of the response to such frequency drops. By providing a method for compensating at least partially a frequency deviation in a grid by determining 130 a set of wind turbines 320 based on a grid frequency criterion (110, and transmitting 140 a command for a transient frequency response to the determined set of wind turbines 320, a solution is provided for providing a more suitable response to the grid, in order to stabilize the grid frequency properly and quickly, without an uncontrolled overcompensation of the grid or excessive oscillatory behavior. Moreover, by combining a step response at the wind turbine 310 level with a differentiation of a trigger mechanism, a new solution may be provided, in order to get more flexibility for designing a response that at the central measurement point offers more flexibility in meeting the local needs for a transient frequency response. By providing such a solution as disclosed herein, the grid operators may take full advantage of the characteristics of this response being to a large extend a programmable characteristic defined by software and/or a controller and not by the limitations of the old fashion power generators.

The invention claimed is:

1. A method for compensating at least partially a frequency deviation in a grid, the method comprising:
   determining a grid frequency,
   applying the grid frequency to a grid frequency criterion,
   in case the grid frequency meets the grid frequency criterion,
      determining a first set of wind turbines from a wind turbine power plant fleet based on the grid frequency criterion to provide a first stepped response at a first frequency, and
      transmitting a command for a first transient frequency response to the first set of wind turbines to provide the first stepped response at the first frequency wherein the command to cause extraction of kinetic energy from a rotor of each wind turbine in the first set of wind turbines;

determining a second set of wind turbines from the wind turbine power plant fleet to provide a second stepped response at a second frequency where the first frequency and the first set of wind turbines are different from the second frequency and the second set of wind turbines;

transmitting a command for a second transient frequency response to the second set of wind turbines to provide the second stepped response at the second frequency to cause extraction of kinetic energy from a rotor of each wind turbine in the second set of wind turbines; and delivering to the grid the kinetic energy of the first stepped response by the first set of wind turbines and the kinetic energy of the second stepped response by the second set of wind turbines.

2. The method as set forth in claim 1, further comprising:
in case the grid frequency meets the grid frequency criterion,
determining a strength of the first transient frequency response for the first set of wind turbines based on the grid frequency criterion, and
transmitting the command for the first transient frequency response to the first set of wind turbines, including the strength of the transient frequency response.

3. The method as set forth in claim 1, further comprising:
in case the grid frequency meets the grid frequency criterion,
determining the strength of the first transient frequency response individually for each wind turbine from the first set of wind turbines, and
transmitting the command for the first transient frequency response individually to each wind turbine from to the first set of wind turbines, including the respective strength of the first transient frequency response.

4. The method as set forth in claim 1, further comprising:
in case the grid frequency meets the grid frequency criterion,
determining an amount of additional power needed from the wind turbine power plant fleet based on the grid frequency criterion, and
determining the first set of wind turbines from the wind turbine power plant fleet based on the amount of additional power needed.

5. The method as set forth in claim 2, wherein:
determining the strength of the first transient frequency response for the first set of wind turbines is further based on an amount of additional power needed.

6. The method as set forth in claim 3, wherein:
determining the strength of the first transient frequency response individually for each wind turbine from the first set of wind turbines is further based on an amount of additional power needed.

7. The method as set forth in claim 1, wherein:
determining the first set of wind turbines and the second set of wind turbines from the wind turbine power plant fleet is further based on the number of wind turbines being online in the wind turbine power plant fleet.

8. The method as set forth in claim 2, wherein:
determining the strength of the first transient frequency response for the first set of wind turbines is further based on the number of wind turbines being online in the wind turbine power plant fleet.

9. The method as set forth in claim 3, wherein:
determining the strength of the first transient frequency response individually for each wind turbine from the first set of wind turbines is further based on the number of wind turbines being online in the wind turbine power plant fleet.

10. The method as set forth in claim 2, wherein:
determining the strength of the first transient frequency response for the first set of wind turbines is further based on an average energy production level of the wind turbines in the wind turbine power plant fleet.

11. The method as set forth in claim 3, wherein:
determining the strength of the first transient frequency response individually for each wind turbine from the first set of wind turbines is further based on an individual energy production level of the respective wind turbine.

12. The method as set forth in claim 1, further comprising:
in case the grid frequency meets the grid frequency criterion,
determining a time period for the first transient frequency response for the first set of wind turbines based on the grid frequency criterion, and
transmitting the command for the first transient frequency response to the first set of wind turbines, including the time period of the first transient frequency response.

13. The method as set forth in claim 1, further comprising:
providing at least two grid frequency sub-criteria, and
in case the grid frequency meets one of the at least two grid frequency sub-criteria,
setting this grid frequency sub-criterion as the grid frequency criterion.

14. The method as set forth in claim 13, further comprising:
performing a stepped transient frequency response, by using at least two of the grid frequency sub-criteria.

15. A grid operating device for compensating a frequency deviation in a grid, the grid operating device comprising:
a grid frequency determination unit for determining a grid frequency,
a grid frequency comparison unit for comparing, if the grid frequency meets a grid frequency criterion,
a wind turbines determination unit for determining a first set of wind turbines to provide a first stepped response at a first frequency and a second set of wind turbines to provide a second stepped response at a second frequency from a wind turbine power plant fleet based on the met grid frequency wherein the first set of wind turbines and the first frequency are different from the second set of wind turbines and the second frequency, and
a transient frequency response command transmission unit for transmitting a command for the first stepped response to the first set of wind turbines to cause extraction of kinetic energy from a rotor of each wind turbine in the first set of wind turbines to deliver the kinetic energy of the first set of wind turbines to the grid and for transmitting a command for a second stepped response to the second set of wind turbines to cause extraction of kinetic energy from a rotor of each wind turbine in the second set of wind turbines to deliver the kinetic energy of the second set of wind turbines to the grid.

16. The method as set forth in claim 1, further comprising:
determining a third set of wind turbines from the wind turbine power plant fleet to provide a third stepped response at a third frequency where the first set of wind turbines and the second set of wind turbines are different from the third set of wind turbines and the third stepped response is different from the first and second stepped responses;

transmitting a command for a third transient frequency response to the third set of wind turbines to provide the third stepped response at the third frequency to cause extraction of kinetic energy from a rotor of each wind turbine in the third set of wind turbines; and delivering to the grid the kinetic energy of the third stepped response by the third set of wind turbines.

17. The grid operating device as set forth in claim 15, wherein the wind turbines determination unit for determining a third set of wind turbines to provide a third stepped response at a third frequency;

wherein the transient frequency response command transmission unit for transmitting a command for the third stepped response to the third set of wind turbines to cause extraction of kinetic energy from a rotor of each wind turbine in the third set of wind turbines to deliver the kinetic energy of the third set of wind turbines to the grid; and wherein the first set of wind turbines and the second set of wind turbines are different from the third set of wind turbines and the third stepped response is different from the first and second stepped responses.

* * * * *